US011061200B2

(12) United States Patent
Hayashi et al.

(10) Patent No.: US 11,061,200 B2
(45) Date of Patent: Jul. 13, 2021

(54) IMAGING APPARATUS, IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventors: Kenkichi Hayashi, Saitama (JP);
Yosuke Naruse, Saitama (JP);
Yasunobu Kishine, Saitama (JP); Daiki Komatsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 16/527,898

(22) Filed: Jul. 31, 2019

(65) Prior Publication Data

US 2019/0353871 A1 Nov. 21, 2019

Related U.S. Application Data

(63) Continuation of application No. PCT/JP2017/045026, filed on Dec. 15, 2017.

(30) Foreign Application Priority Data

Mar. 1, 2017 (JP) ................... 2017-038445

(51) Int. Cl.
*G02B 7/09* (2021.01)
*G06T 3/40* (2006.01)
*G06T 5/00* (2006.01)

(52) U.S. Cl.
CPC .............. *G02B 7/09* (2013.01); *G06T 3/40* (2013.01); *G06T 5/003* (2013.01)

(58) Field of Classification Search
CPC .. G02B 7/09; G06T 5/003; G06T 3/40; H04N 5/23212
See application file for complete search history.

(56) References Cited

U.S. PATENT DOCUMENTS 7,245,319 B1 7/2007 Enomoto
9,407,827 B2* 8/2016 Cao .................. G03B 13/36
(Continued)

FOREIGN PATENT DOCUMENTS

JP 11-23949 A 1/1999
JP 2000-69343 A 3/2000
(Continued)

OTHER PUBLICATIONS

International Preliminary Report on Patentability and Written Opinion of the International Searching Authority (PCT/IB/326, PCT/IB/373, and PCT/ISA/237) for International Application No. PCT/JP2017/045026, dated Sep. 12, 2019, with English translation of the Written Opinion.

(Continued)

*Primary Examiner* — Daniel G Mariam
(74) *Attorney, Agent, or Firm* — Birch, Stewart, Kolasch & Birch, LLP

(57) ABSTRACT

Provided are an imaging apparatus, an image processing apparatus, an image processing method, and a non-transitory computer readable recording medium storing an image processing program capable of appropriately correcting both of focus breathing and distortion. Focus breathing is corrected by subjecting image data to magnification/reduction processing according to a magnification/reduction rate determined for each focus position. Distortion is corrected through image processing to the image data with focus breathing corrected. In correcting distortion, distortion appearing in image data after correction of focus breathing is corrected.

14 Claims, 15 Drawing Sheets

(56) References Cited

U.S. PATENT DOCUMENTS

| | | | |
|---|---|---|---|
| 10,127,474 B2* | 11/2018 | Stern | H04N 5/217 |
| 2003/0218683 A1 | 11/2003 | Kurase | |
| 2013/0265468 A1 | 10/2013 | Morimura | |

FOREIGN PATENT DOCUMENTS

| | | |
|---|---|---|
| JP | 2003-333588 A | 11/2003 |
| JP | 2004-64710 A | 2/2004 |
| JP | 2007-37176 A | 2/2007 |
| JP | 2008-160622 A | 7/2008 |
| JP | 2012-142885 A | 7/2012 |
| JP | 2013-131848 A | 7/2013 |

OTHER PUBLICATIONS

International Search Report (Form PCT/ISA/210) for International Application No. PCT/JP2017/045206, dated Feb. 27, 2018, with English translation.

* cited by examiner

IMAGING APPARATUS, IMAGE PROCESSING APPARATUS, IMAGE PROCESSING METHOD, AND IMAGE PROCESSING PROGRAM

CROSS-REFERENCE TO RELATED APPLICATIONS

This application is a Continuation of PCT International Application No. PCT/JP2017/045026 filed on Dec. 15, 2017, which claims priority under 35 U.S.C. § 119(a) to Japanese Patent Application No. 2017-038445 filed on Mar. 1, 2017. Each of the above application(s) is hereby expressly incorporated by reference, in its entirety, into the present application.

BACKGROUND OF THE INVENTION

1. Field of the Invention

The present invention relates to an imaging apparatus, an image processing apparatus, an image processing method, and a non-transitory computer readable recording medium storing an image processing program, and in particular, to an imaging apparatus, an image processing apparatus, and image processing method, and a non-transitory computer readable recording medium storing an image processing program that correct focus breathing and distortion through image processing.

2. Description of the Related Art

Among imaging lenses, an imaging lens in which focus breathing occurs is known. Focus breathing refers to a phenomenon that an angle of view fluctuates with focusing. JP1999-023949A (JP-H11-023949A) and JP2008-160622A have suggested a technique for correcting focus breathing through image processing.

Among the imaging lenses, an imaging lens in which distortion occurs is known. Distortion refers to a phenomenon that a formed image is distorted. JP2003-333588A and JP2004-064710A have suggested a technique for correcting distortion through image processing.

In the related art, in a case where focus breathing and distortion are corrected through image processing, respective processing is executed independently.

SUMMARY OF THE INVENTION

However, in a case where both of focus breathing and distortion are corrected through the image processing, and the respective processing is executed independently, there is a problem in that the influences of correction of both of focus breathing and distortion appear mutually, and appropriate correction cannot be performed.

The invention has been accomplished in consideration of such a situation, and an object of the invention is to provide an imaging apparatus, an image processing apparatus, an image processing method, and a non-transitory computer readable recording medium storing an image processing program capable of appropriately correcting both of focus breathing and distortion.

Means for solving the above-described problem is as follows.

(1) An imaging apparatus comprising an imaging lens having a focusing lens, an image sensor that captures an image formed by the imaging lens, an image data generation unit that processes a signal output from the image sensor to generate image data, a focus breathing correction unit that corrects focus breathing by subjecting the image data to magnification/reduction processing according to a magnification/reduction rate determined for each focus position, and a distortion correction unit that corrects distortion appearing in the image data after correction of focus breathing through image processing.

According to the aspect, both of focus breathing and distortion are corrected through the image processing. Focus breathing is corrected by subjecting the image data to the magnification/reduction processing according to the magnification/reduction rate determined for each focus position. In regard to distortion, distortion appearing in the image data after correction of focus breathing is corrected through the image processing. While distortion appears in the image data due to the imaging lens, the appearance of distortion changes in a case where focus breathing is corrected through the image processing. In the aspect, distortion appearing in the image data after correction of focus breathing is corrected through the image processing. With this, it is possible to appropriately correct both of focus breathing and distortion through the image processing.

(2) The imaging apparatus of (1), in which the magnification/reduction rate is set to a value for reducing distortion caused in the image data due to the imaging lens by a predetermined amount.

According to the aspect, the magnification/reduction rate of the image data in correcting focus breathing is set to the value for reducing distortion caused in the image data due to the imaging lens by the predetermined amount. With this, it is possible to reduce a correction amount of distortion.

(3) The imaging apparatus of (2), in which the magnification/reduction rate is set to a value for minimizing distortion caused in the image data due to the imaging lens.

According to the aspect, the magnification/reduction rate of the image data in correcting focus breathing is set to the value for minimizing distortion caused in the image data due to the imaging lens. With this, it is possible to reduce a correction amount of distortion.

(4) The imaging apparatus of (2), in which the magnification/reduction rate is set to a value for reducing distortion by a predetermined amount at an image height at which distortion becomes a maximum.

According to the aspect, the magnification/reduction rate of the image data in correcting focus breathing is set to the value for reducing distortion by the predetermined amount at the image height at which distortion becomes a maximum. With this, it is possible to reduce a correction amount of distortion.

(5) The imaging apparatus of (2), in which the magnification/reduction rate is set to a value for reducing distortion in an image central portion by a predetermined amount.

According to the aspect, the magnification/reduction rate of the image data in correcting focus breathing is set to the value for reducing distortion in the image central portion by the predetermined amount. With this, it is possible to reduce a correction amount of distortion.

(6) The imaging apparatus of (1), in which, in a case where the distortion correction unit divides the image data into a plurality of regions and executes correction processing for each region, the magnification/reduction rate is set to a value correctable in the distortion correction unit.

According to the aspect, the magnification/reduction rate of the image data in correcting focus breathing is set to the value correctable in the distortion correction unit. With this, it is possible to reliably correct distortion.

(7) The imaging apparatus of any one of (1) to (6), in which distortion caused in the image data due to the imaging lens is only either of positive or negative.

According to the aspect, the imaging lens is composed such that distortion appears only one of positive or negative. With this, it is possible to keep a magnification/reduction direction constant in setting a correction amount (magnification/reduction rate) of focus breathing from a viewpoint of distortion correction.

(8) The imaging apparatus of any one of (1) to (7), in which the distortion correction unit corrects distortion appearing in the image data after correction of focus breathing according to a specific magnification/reduction rate through image processing.

According to the aspect, a configuration is made in which distortion appearing in the image data after correction of focus breathing according to the magnification/reduction rate is corrected through the image processing. That is, while focus breathing is corrected for each focus position, distortion is corrected by a given correction amount. With this, it is possible to reduce a load of correction of distortion.

(9) An image processing apparatus comprising an image data acquisition unit that acquires image data obtained through imaging, a focus position information acquisition unit that acquires information of a focus position of an imaging lens when the image data is captured, a focus breathing correction unit that corrects focus breathing by subjecting the image data to magnification/reduction processing according to a magnification/reduction rate determined for each focus position, and a distortion correction unit that corrects distortion appearing in the image data after correction of focus breathing through image processing.

According to the aspect, both of focus breathing and distortion are corrected through the image processing. Focus breathing is corrected by subjecting the image data to the magnification/reduction processing according to the magnification/reduction rate determined for each focus position. In regard to distortion, distortion appearing in the image data after correction of focus breathing is corrected through the image processing. With this, it is possible to appropriately correct both of focus breathing and distortion through the image processing.

(10) An image processing method comprising a step of acquiring image data obtained through imaging, a step of acquiring information of a focus position of an imaging lens when the image data is captured, a step of correcting focus breathing by subjecting the image data to magnification/reduction processing according to a magnification/reduction rate determined for each focus position, and a step of correcting distortion appearing in the image data after correction of focus breathing through image processing.

According to the aspect, both of focus breathing and distortion are corrected through the image processing. Focus breathing is corrected by subjecting the image data to the magnification/reduction processing according to the magnification/reduction rate determined for each focus position. In regard to distortion, distortion appearing in the image data after correction of focus breathing is corrected through the image processing. With this, it is possible to appropriately correct both of focus breathing and distortion through the image processing.

(11) A non-transitory computer readable recording medium storing an image processing program that causes a computer to implement a function of acquiring image data obtained through imaging, a function of acquiring information of a focus position of an imaging lens when the image data is captured, a function of correcting focus breathing by subjecting the image data to magnification/reduction processing according to a magnification/reduction rate determined for each focus position, and a function of correcting distortion appearing in the image data after correction of focus breathing through image processing.

According to the aspect, both of focus breathing and distortion are corrected through the image processing. Focus breathing is corrected by subjecting the image data to the magnification/reduction processing according to the magnification/reduction rate determined for each focus position. In regard to distortion, distortion appearing in the image data after correction of focus breathing is corrected through the image processing. With this, it is possible to appropriately correct both of focus breathing and distortion through the image processing.

According to the invention, it is possible to appropriately correct both of focus breathing and distortion.

DESCRIPTION OF THE PREFERRED EMBODIMENTS

Hereinafter, a preferred embodiment for carrying out the invention will be described in detail referring to the accompanying drawings.

First Embodiment

[Apparatus Configuration]

Figure 1:
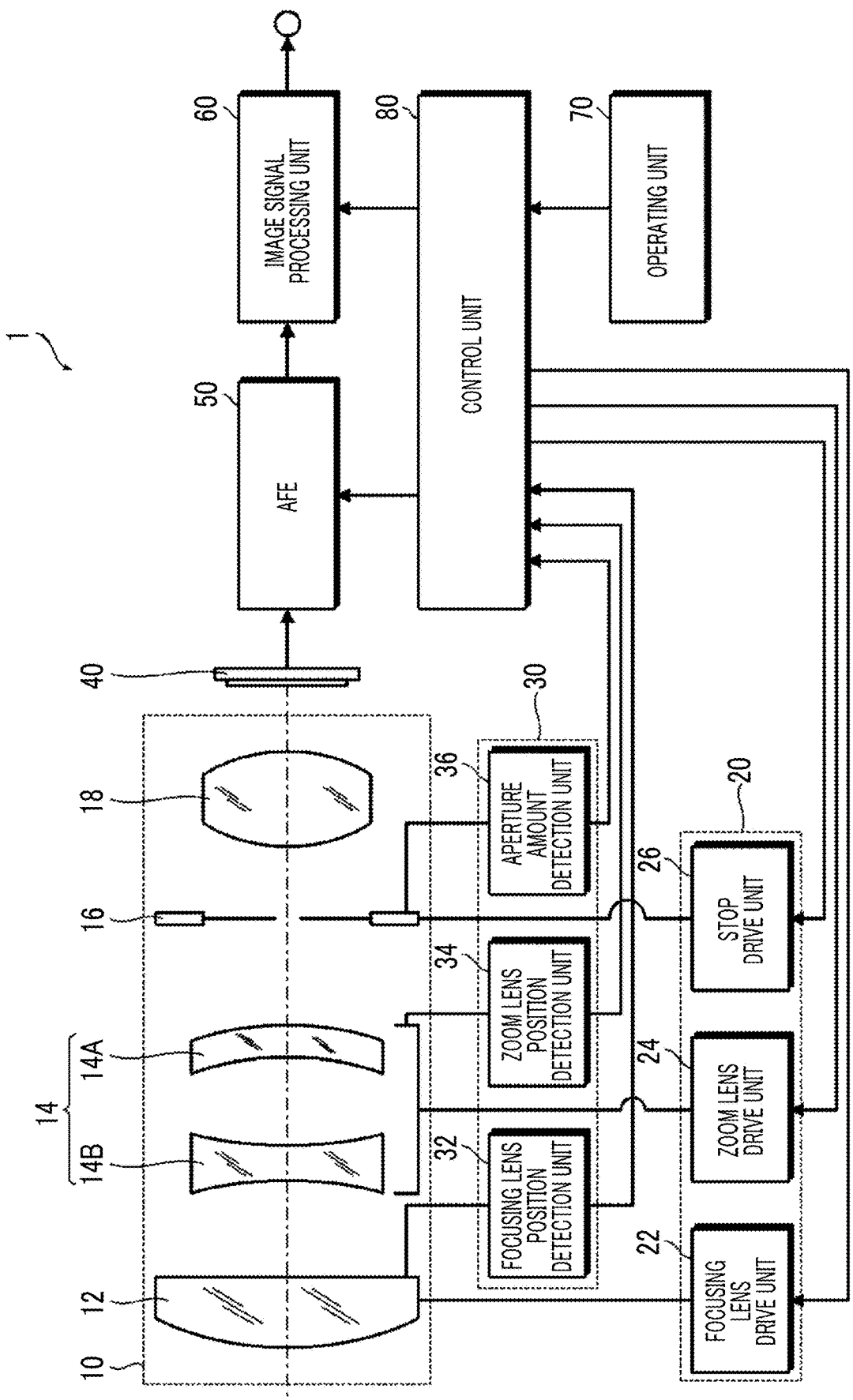
FIG. 1 is a schematic configuration diagram showing an embodiment of an imaging apparatus to which the invention is applied.

FIG. 1 is a schematic configuration diagram showing an example of an embodiment of an imaging apparatus to which the invention is applied.

As shown in FIG. 1, an imaging apparatus 1 primarily comprises an imaging lens 10, a lens drive unit 20, a detection unit 30, an image sensor 40, an analog front end 50, an image signal processing unit 60, an operating unit 70, and a control unit 80.

«Imaging Lens»

The imaging lens 10 is composed of four groups of zoom lenses having a focusing function, and comprises a focusing lens 12, a variator lens 14A, a compensator lens 14B, a stop 16, and a relay lens 18.

The imaging lens 10 performs focusing by moving the focusing lens 12 along an optical axis. Furthermore, zooming is performed by moving the zoom lens 14 composed of the variator lens 14A and the compensator lens 14B along the optical axis. In addition, an amount of light is adjusted by operating the stop 16.

«Lens Drive Unit»

The lens drive unit 20 comprises a focusing lens drive unit 22 that drives the focusing lens 12, a zoom lens drive unit 24 that drives the zoom lens 14, and a stop drive unit 26 that drives the stop 16.

The focusing lens drive unit 22 comprises a focusing motor and a drive circuit for the focusing motor. The focusing lens drive unit 22 moves the focusing lens 12 along the optical axis by driving the focusing motor in response to a command of the control unit 80.

The zoom lens drive unit 24 comprises a zoom motor and a drive circuit for the zoom motor. The zoom lens drive unit 24 moves the variator lens 14A and the compensator lens 14B along the optical axis by driving the zoom motor in response to a command of the control unit 80.

The stop drive unit 26 comprises a stop motor and a drive circuit for the stop motor. The stop drive unit 26 rotationally drives a drive ring of the stop 16 by driving the stop motor in response to a command of the control unit 80, and magnifies and reduces a stop leaf blade.

«Detection Unit»

The detection unit 30 comprises a focusing lens position detection unit 32 that detects a position of the focusing lens 12, a zoom lens position detection unit 34 that detects a position of the zoom lens 14, and an aperture amount detection unit 36 that detects an aperture amount of the stop 16.

The focusing lens position detection unit 32 detects the position of the focusing lens 12 as a focus position and outputs a detection result to the control unit 80.

The zoom lens position detection unit 34 detects a position of the variator lens 14A as a zoom position and outputs a detection result to the control unit 80.

The aperture amount detection unit 36 detects a rotation position of the drive ring that drives the stop 16 to detect the aperture amount of the stop 16 and outputs a detection result to the control unit 80.

«Image Sensor»

The image sensor 40 captures an image formed by the imaging lens 10. The image sensor 40 is composed of, for example, a solid imaging element, such as a complementary metal oxide semiconductor (CMOS) or a charged coupled device (CCD) having a predetermined color filter array.

«Analog Front End (AFE)»

The analog front end 50 executes predetermined analog signal processing, such as correlated double sampling (CDS) processing, automatic gain control (AGC) processing, or clamp processing, on an analog image signal output from the image sensor 40, converts the processed analog image signal to a digital image signal, and outputs the digital image signal.

«Image Signal Processing Unit»

The image signal processing unit 60 fetches the digital image signal output from the analog front end 50 and executes predetermined signal processing to generate image data. The image signal processing unit 60 executes focus breathing correction processing and distortion correction processing on generated image data and outputs image data.

Figure 2:
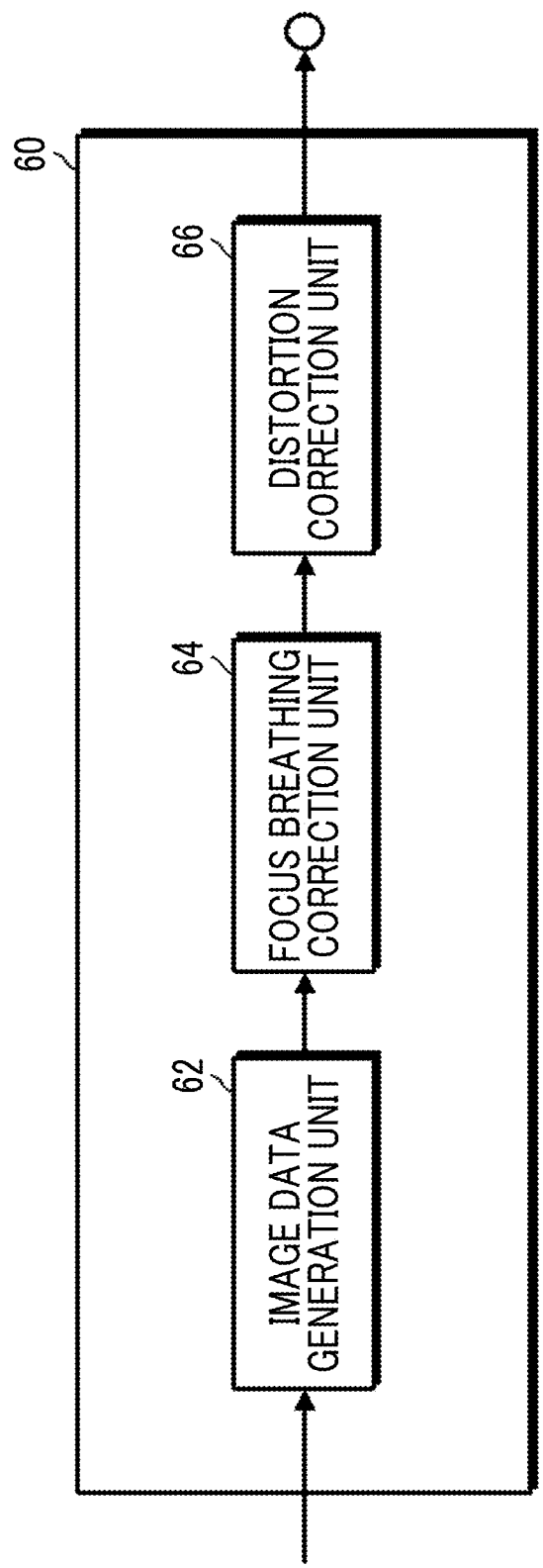
FIG. 2 is a block diagram of functions that are provided by an image signal processing unit.

FIG. 2 is a block diagram of functions that are provided by the image signal processing unit.

The image signal processing unit 60 includes an image data generation unit 62, a focus breathing correction unit 64, and a distortion correction unit 66.

<Image Data Generation Unit>

The image data generation unit 62 executes predetermined signal processing, such as various kinds of correction processing, such as white balance adjustment, gamma correction, and sharpness correction, demosaicing processing (processing for executing color interpolation processing on an image signal of R, and B to a set of image signals (R sign, G signal, and B signal) to be output from each pixel of the image sensor 40), and YCrCb conversion processing (processing for converting demosaiced R, and B signals for each pixel to a brightness signal Y and color difference signals Cr and Cb), on the input digital image signal to generate image data.

<Focus Breathing Correction Unit>

The focus breathing correction unit 64 subjects image data to magnification/reduction processing according to a magnification/reduction rate determined for each focus position to correct focus breathing. Focus breathing refers to a phenomenon that an angle of view fluctuates with focusing.

Figure 3:
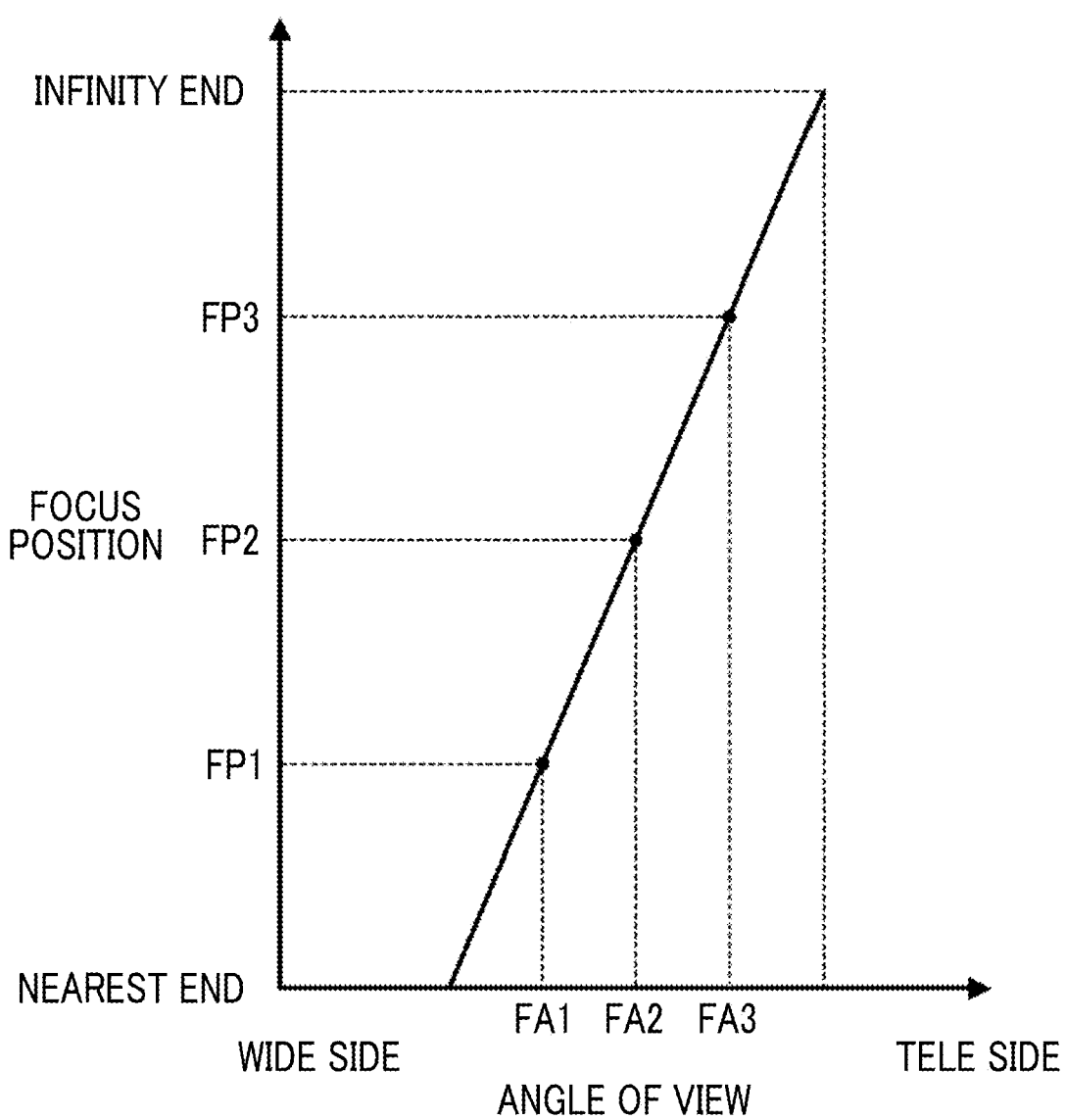
FIG. 3 is a graph showing the relationship between a focus position and an angle of view.

FIG. 3 is a graph showing the relationship between the focus position and the angle of view. In FIG. 3, the vertical axis is the focus position (the position of the focusing lens), and the horizontal axis is the angle of view.

As shown in FIG. 3, in a case where the focus position changes, the angle of view changes in conjunction with the change in focus position.

In an example shown in FIG. 3, for simplification of description, although the relationship between the focus position and the angle of view is shown by a line, in a case where the focus position is changed, how the angle of view changes is different depending on the imaging lens. Even in a case of the same imaging lens, a way of change in angle of view is different depending on the zoom position.

As shown in FIG. 3, since the angle of view changes depending on the focus position, focus breathing can be corrected by subjecting image data to the magnification/reduction processing (also referred to as electronic zoom, digital zoom, or the like) according to a predetermined magnification/reduction rate for each focus position.

For example, in the example shown in FIG. 3, a position of a point FP2 is set as a reference focus position. Now, it is assumed that the focus position moves from the point FP2 to a point FP1 on a nearest end side. In this case, the angle of view changes from FA2 to FA1, and is magnified by the difference only. That is, a range to be imaged is magnified. Accordingly, in this case, the fluctuation of the angle of view can be cancelled by subjecting image data to magnification processing by a magnified amount of the angle of view. Furthermore, it is assumed that the focus position moves from the point FP2 to a point FP3 on an infinity end side. In this case, the angle of view changes from FA2 to FA3, and is reduced by the difference only. That is, the range to be imaged is reduced. Accordingly, in this case, the fluctuation of the angle of view can be cancelled by subjecting image data to reduction processing by a reduced amount of the angle of view only.

In this way, focus breathing can be corrected by subjecting image data to the magnification/reduction processing according to the predetermined magnification/reduction rate for each focus position. The focus breathing correction unit 64 subjects image data to the magnification/reduction processing at the magnification/reduction rate determined for each focus position to correct focus breathing.

Since focus breathing is changed according to the zoom position, a correction amount (the magnification/reduction rate determined for each focus position) of focus breathing is set for each zoom position.

In a case where image data is subjected to the reduction processing to correct focus breathing, it is a prerequisite that a part of an image captured by the image sensor 40 is segmented and output. That is, in a case where there is no image with an angle of view equal to or greater than the angle of view as a reference, the reduction processing cannot be executed. For this reason, in a case where image data is subjected to the reduction processing to correct focus breathing, it is a prerequisite that a part of an image is segmented and output.

Figure 4:
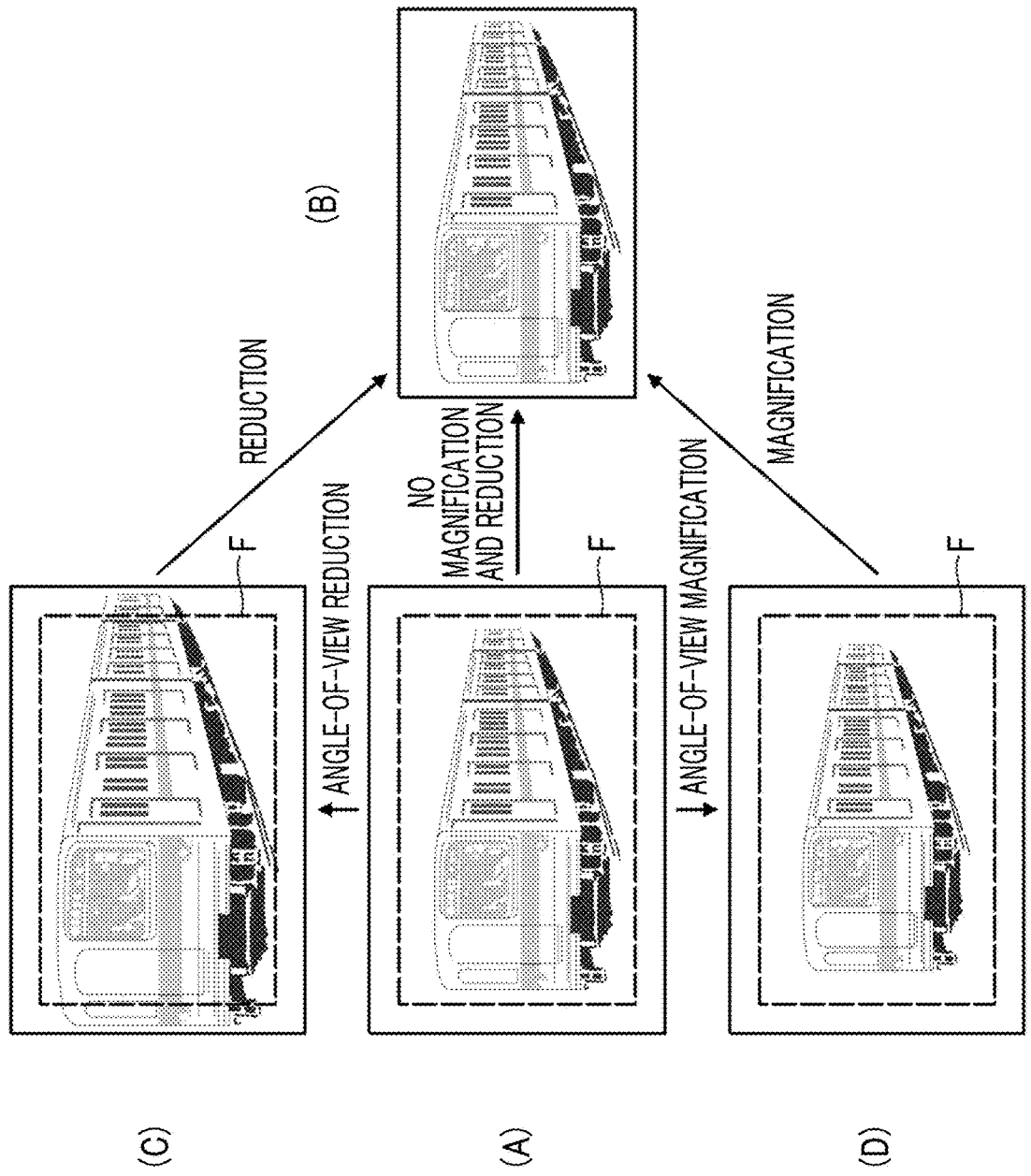
FIG. 4 is an explanatory view of image segmentation and magnification/reduction processing.

FIG. 4 is an explanatory view of image segmentation and magnification/reduction processing. (A) of FIG. 4 shows an example of an image captured at the angle of view to be a reference. (B) of FIG. 4 shows an example of an image that is output as a captured image. (C) of FIG. 4 shows an example of a case where an angle of view of an image to be captured is reduced from the angle of view to be a reference due to focus breathing. (D) of FIG. 4 shows an example of a case where an angle of view of an image to be captured is magnified from the angle of view to be a reference due to focus breathing.

In (A), (C), and (D) of FIG. 4, a frame F indicated by a broken line is a range of an image to be segmented.

As shown in (A) and (B) of FIG. 4, in a case of an image captured at the angle of view to be a reference, an image within the frame F is output as it is.

As shown in (C) of FIG. 4, in a case where an angle of view of an image to be captured is reduced from the angle of view to be a reference due to focus breathing (in a case of being zoomed to a tele side), an image is reduced through the reduction processing and is output.

As shown in (D) of FIG. 4, in a case where an angle of view of an image to be captured is magnified from the angle of view to be a reference due to focus breathing (in a case of being zoomed to a wide side), an image is magnified through the magnification processing and is output.

A focus position to be a reference in correcting focus breathing and an angle of view thereof are set in consideration of a relationship with distortion correction.

In the imaging apparatus 1 of the embodiment, since the focus breathing correction unit 64 acquires image data obtained by imaging from the image data generation unit 62, the focus breathing correction unit 64 functions as an image data acquisition unit.

<Distortion Correction Unit>

The distortion correction unit 66 executes conversion processing of a pixel position and interpolation processing for interpolating a missing pixel with movement of the pixel position on image data to correct distortion appearing in image data.

Figure 5B:
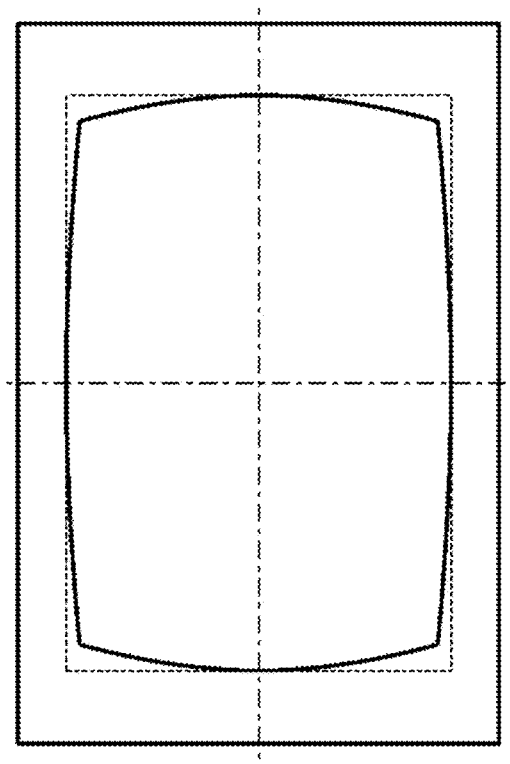
FIGS. 5A and 5B are diagrams showing examples of distortion appearing in image data.
Figure 5A:
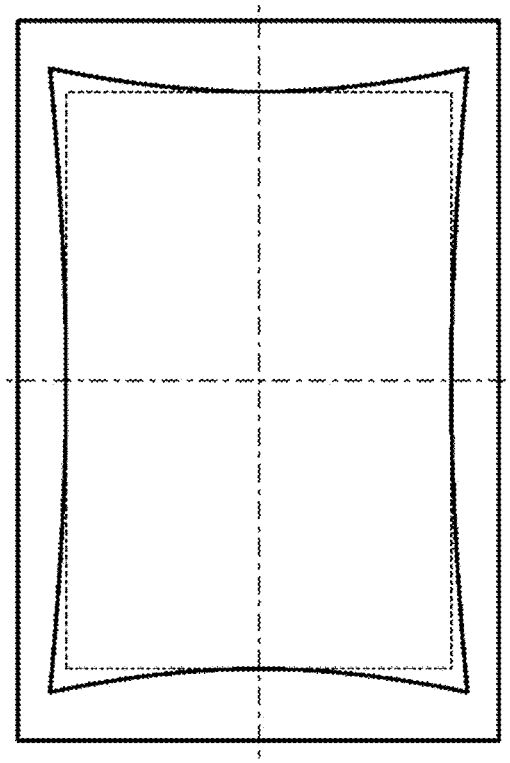

FIGS. 5A and 5B are diagrams showing examples of distortion appearing in image data.

Distortion appearing in an image is divided into two types of pincushion distortion in which a corner portion of an image expands outward and barrel distortion in which a corner portion of an image contracts inward. FIG. 5A shows an example of pincushion distortion.

FIG. 5B shows an example of barrel distortion.

The magnification (distortion amount) of distortion is prescribed by percentage with respect to a distance (image height) from a center of an image.

Figure 6A:
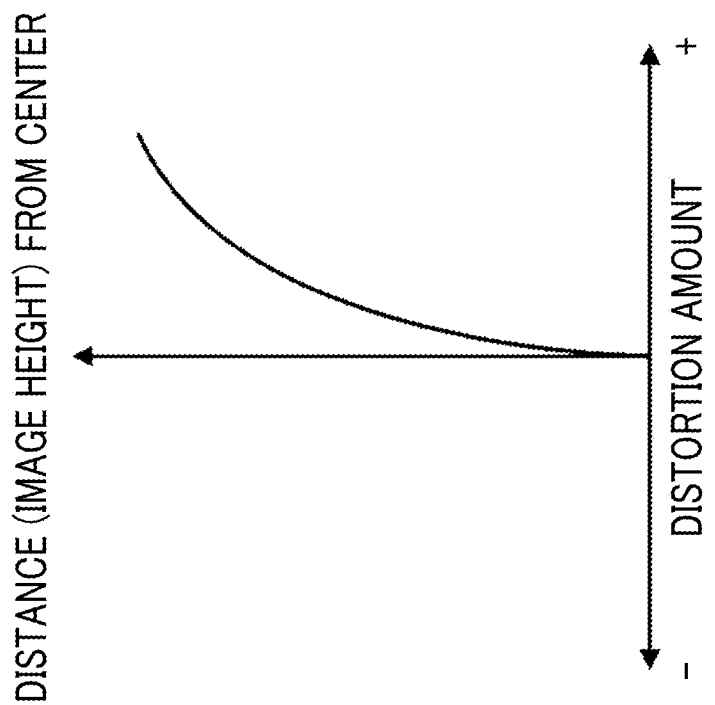
FIGS. 6A and 6B are diagrams showing the relationship (distortion curve) between an image height and a distortion amount.
Figure 6B:
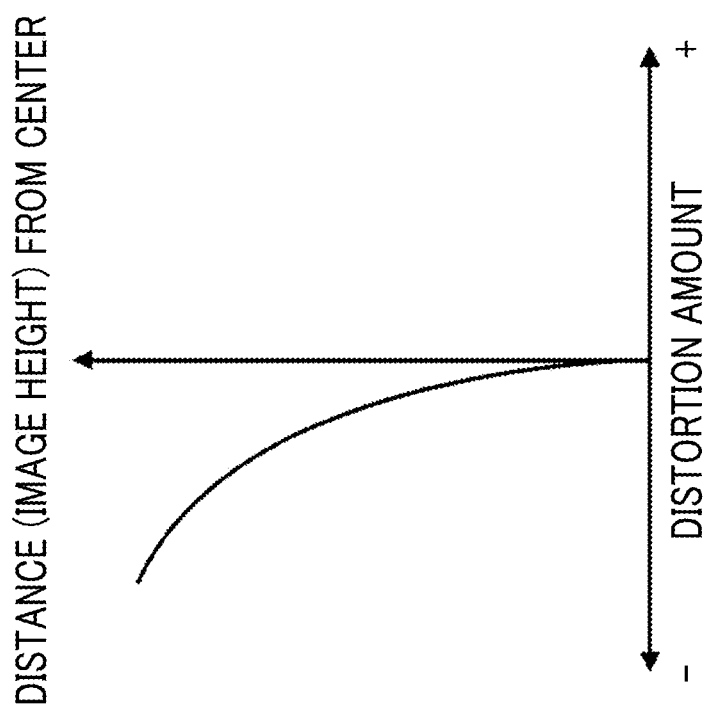

FIGS. 6A and 6B are diagrams showing the relationship (distortion curve) between the image height and the distortion amount.

Distortion includes two types of positive and negative. Distortion having a negative value is pincushion distortion, and in this case, any point in an image is focused at a distance farther from a center portion. Distortion having a positive value is barrel distortion, and in this case, any point in an image is focused at a position closer to a center portion. FIG. 6A shows an example of pincushion distortion. FIG. 6B shows an example of barrel distortion.

The distortion curves shown in FIGS. 6A and 6B can be approximately expressed by a multidimensional function of the distance (image height) from a center of an image. For example, a distortion amount of barrel distortion can be expressed by Expression (1).

$$F(d) = \alpha + \beta \times d + \gamma \times d^2 + \quad (1)$$

Note that d is the distance from the center of the image, and $\alpha$, $\beta$, and $\gamma$ are coefficients.

In a case where coordinates of a pixel in an image with no distortion, that is, after distortion correction, are (x,y) (x and y are integers), corresponding coordinates (X,Y) of an image before distortion correction are represented by Expression (2).

$$(X,Y) = (x \times F(d), y \times F(d)), \ d = (x^2 + y^2)^{1/2} \quad (2)$$

Distortion correction is performed by obtaining the coordinates (X,Y) of the image before correction corresponding to the coordinates (x,y) of the image after correction and moving pixel data P in the coordinates (X,Y) in the image before correction to the coordinates (x,y) of the image after correction.

Note that the coordinates (X,Y) of the image before correction obtained by Expression (2) described above do not become an integer value, and there is no corresponding pixel data in the image before correction. For this reason, pixel data P corresponding to the obtained coordinates (X,Y) of the image needs to be obtained and interpolated from real pixel data near the coordinates (X,Y) of the image before correction through interpolation. As an interpolation method in this case, a nearest neighbor interpolation method and a bi-linear interpolation method can be exemplified.

In all interpolation methods, the coordinates (X,Y) of the image before correction corresponding to the coordinates (x,y) in the image after correction are obtained through computation, and pixel data P is obtained using pixel data of the image before correction near the obtained coordinates (X,Y) according to the above-described interpolation method. The obtained pixel data P is set as pixel data of the coordinates (x,y) in the image after correction, whereby distortion can be corrected.

In the imaging apparatus 1 of the embodiment, the distortion correction unit 66 divides image data into a plurality of regions and executes correction processing for each region.

Figure 7:
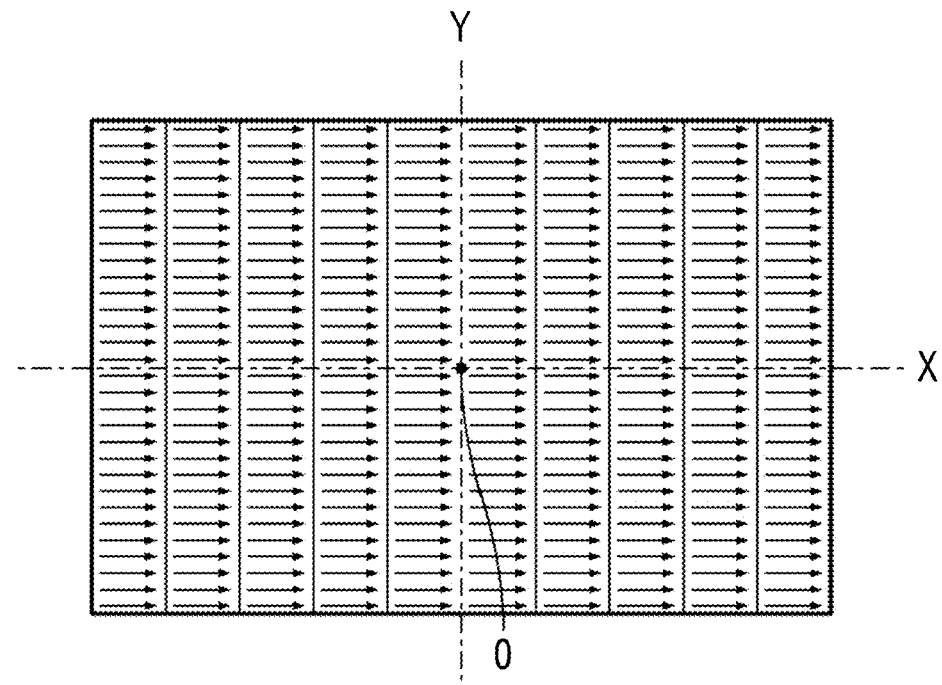
FIG. 7 is an explanatory view of a processing procedure of correction processing in a distortion correction unit.

FIG. 7 is an explanatory view of a processing procedure of the correction processing in the distortion correction unit.

As shown in FIG. 7, the distortion correction unit 66 divides image data into a plurality of blocks along an X-axis direction (horizontal direction) and executes the correction processing for each block. That is, image data is read in units of blocks, and the correction processing is executed. At this time, the distortion correction unit 66 scans the block in the X-axis direction to read a pixel value of each pixel for each line and executes the correction processing.

Figure 8:
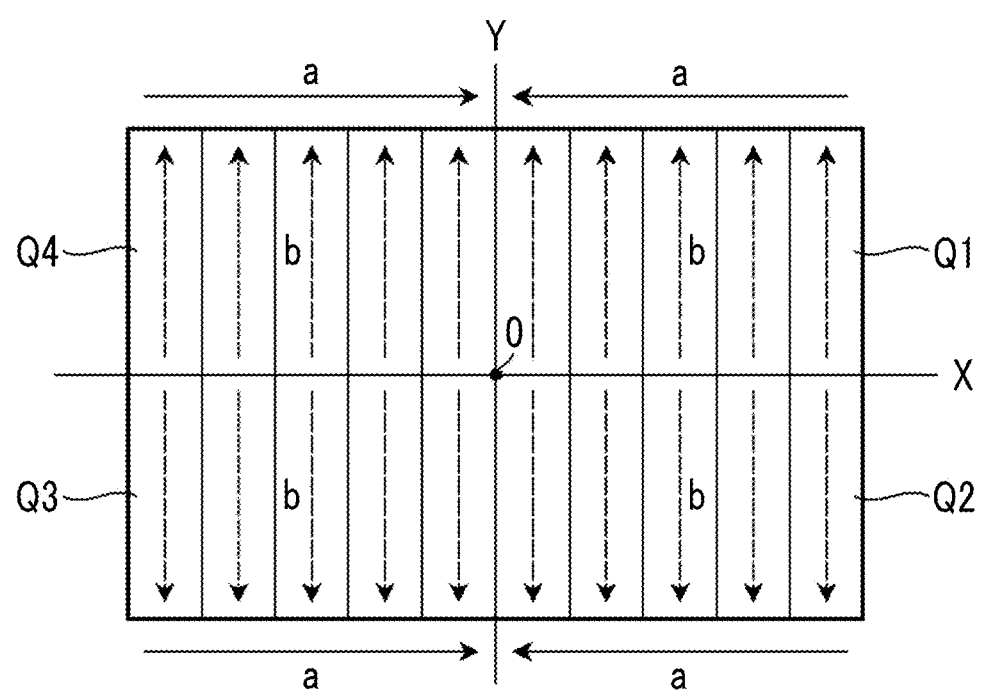
FIG. 8 is an explanatory view of another example of a processing procedure of the correction processing in the distortion correction unit.

FIG. 8 is an explanatory view of another example of a processing procedure of the correction processing in the distortion correction unit 66.

In a case where image data is divided into a plurality of regions and the correction processing is executed for each region, as shown in FIG. 8, image data may be divided into four quadrants Q1 to Q4 and the correction processing may be executed for each of the quadrants Q1 to Q4. Each of the quadrants Q1 to Q4 passes through a center O of an image and is divided by an X axis and a Y axis perpendicular to each other. The distortion correction unit 66 further divides each of the divided quadrants Q1 to Q4 into a plurality of blocks and executes the correction processing for each block. That is, each of the quadrants Q1 to Q4 is divided into a plurality of blocks along the X-axis direction and the correction processing is executed for each block. At this time, as indicated by an arrow "a" of a solid line, the respective blocks are processed in order from the outside toward the inside of image data. In each block, as indicated by an arrow "b" of a broken line, a pixel value of each pixel is read in order closer to the X axis, and the correction processing is executed.

In this way, image data is divided into a plurality of regions and the correction processing is executed for each region, whereby the capacity of a buffer memory to be used in processing can be reduced.

On the other hand, while distortion appears in image data due to the imaging lens 10, the appearance of distortion changes in a case where focus breathing is corrected through the image processing.

For this reason, in the imaging apparatus 1 of the embodiment, correction parameters for distortion correction are set so as to correct distortion appearing in image data after correction of focus breathing.

The distortion amount appearing in image data can be reduced by correcting focus breathing through the image processing. Accordingly, a load of distortion correction can also be reduced by correcting focus breathing through the image processing. That is, the distortion amount can be reduced, whereby the number of correction parameters can be reduced. Therefore, a processing load can be reduced.

Distortion that occurs due to the imaging lens 10 can be obtained in advance. Furthermore, distortion appearing in a case where focus breathing is corrected on image data, in which distortion occurs, can also be obtained in advance.

The distortion correction unit 66 corrects distortion of image data after focus breathing correction using the correction parameters set so as to correct distortion appearing in image data after correction of focus breathing.

Since focus breathing is corrected depending on the zoom position and the focus position, distortion correction is also performed depending on the zoom position and the focus position. Accordingly, the correction parameters are prepared for each of the zoom position and the focus position.

Image data after distortion correction is output from an output terminal as a captured image. The output image is displayed on a monitor (not shown) or is recorded in a storage.

«Operating Unit»

The operating unit 70 includes various operating members, such as a focus demand and a zoom demand and the like, and operation circuits that output operation signals of the operating members to the control unit.

«Control Unit»

The control unit 80 integrally controls the overall operation of the imaging apparatus 1 based on an operation of the operating unit 70. The control unit 80 provides needed information to the respective units when the respective units of the image signal processing unit 60 process image data. That is, the focus breathing correction unit 64 acquires information regarding the focus position and the zoom position detected by the focusing lens position detection unit 32 and the zoom lens position detection unit 34 at the time of focus breathing correction and provides the acquired information to the focus breathing correction unit 64. Furthermore, the distortion correction unit 66 acquires information regarding the focus position and the zoom position detected by the focusing lens position detection unit 32 and the zoom lens position detection unit 34 at the time of distortion correction and provides the acquired information to the distortion correction unit 66. Accordingly, in the imaging apparatus 1 of the embodiment, the control unit 80 functions as a focus position information acquisition unit.

[Action]

Next, an action (image processing method) of the imaging apparatus 1 of the embodiment configured as above will be described.

In a case where imaging is instructed by the operating unit 70, an image formed by the imaging lens 10 is captured by the image sensor 40.

An image signal output from the image sensor 40 is first applied to the analog front end 50, is subjected to predetermined analog signal processing, and then, is converted to a digital image signal and is output. The image signal output from the analog front end 50 is input to the image signal processing unit 60.

The image signal input to the image signal processing unit 60 is first subjected to the predetermined signal processing in the image data generation unit 62, and image data is generated.

The generated image data is applied to the focus breathing correction unit 64, and is subjected to focus breathing correction. The focus breathing correction unit 64 acquires information regarding the focus position and the zoom position of the imaging lens 10 at the time of capturing of image data through the control unit 80 and subjects image data to the magnification/reduction processing according to the magnification/reduction rate determined for each of the focus position and the zoom position to correct focus breathing.

Image data with focus breathing corrected is applied to the distortion correction unit 66, and is subjected to distortion correction. The distortion correction unit 66 corrects distortion appearing in image data after correction of focus breathing through the image processing. The distortion correction unit 66 acquires information regarding the focus position and the zoom position of the imaging lens 10 at the time of capturing of image data and subjects image data to the image processing with the correction parameters determined for each of the focus position and the zoom position to correct distortion appearing in image data after focus breathing correction.

Image data after distortion correction is output from the output terminal as a captured image. An output image is displayed on the monitor (not shown) or is recorded in the storage.

In this way, in the imaging apparatus 1 of the embodiment, both of focus breathing and distortion are corrected through the image processing. In correcting distortion, distortion appearing in image data after focus breathing correction is corrected. With this, both of focus breathing and distortion can be appropriately corrected through the image processing.

Furthermore, the distortion amount appearing in image data can be reduced by correcting focus breathing through the image processing. With this, a processing load of distortion correction can be reduced.

Second Embodiment

As described above, the distortion amount can be reduced by correcting focus breathing through the image processing, and the processing load of distortion correction can be reduced.

Accordingly, in a case where the correction amount (magnification/reduction rate) of focus breathing is decided from a viewpoint of distortion correction, the processing load at the time of distortion correction can be further reduced. That is, the processing load at the time of distortion correction can be further reduced by setting the correction amount of focus breathing such that distortion caused in image data due to the imaging lens is reduced by a predetermined amount.

As a method of deciding the correction amount of focus breathing from a viewpoint of distortion correction, the following three methods are considered.

(A) A method of setting the correction amount of focus breathing to a value for reducing distortion by a predetermined amount at an image height at which distortion becomes a maximum;

(B) a method of setting the correction amount of focus breathing to a value for reducing distortion in an image central portion by a predetermined amount; and (C) a method of setting the correction amount of focus breathing to a value for minimizing distortion caused in image data due to the imaging lens.

Hereinafter, a setting example according to each method will be described.

Figure 9A:
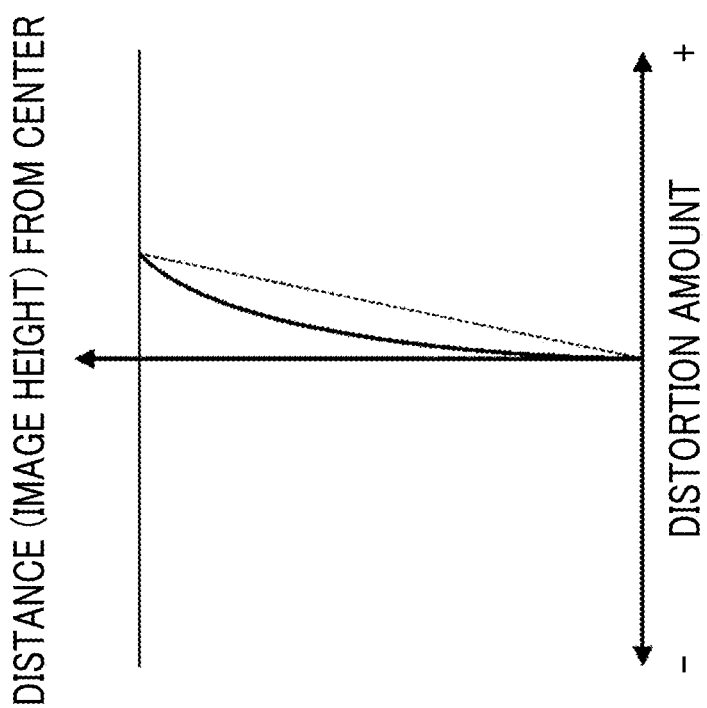
FIGS. 9A and 9B are explanatory views of a case where a correction amount of focus breathing is set to a value for reducing distortion by a predetermined amount at an image height at which distortion becomes a maximum.
Figure 9B:
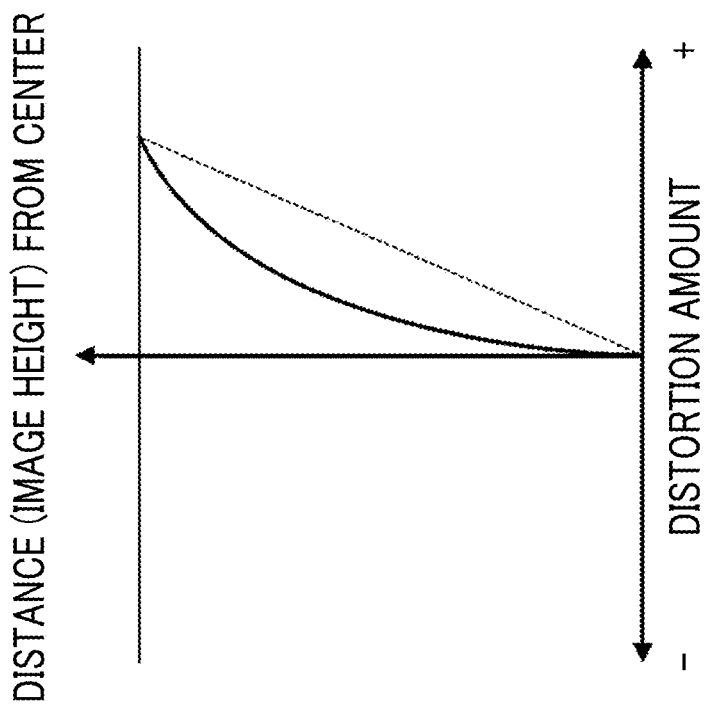

(A) In a case where the correction amount of focus breathing is set to the value for reducing distortion by the predetermined amount at the image height at which distortion becomes a maximum FIGS. 9A and 9B are explanatory views in a case where the correction amount of focus breathing is set to the value for reducing distortion by the predetermined amount at the image height at which distortion becomes a maximum. FIG. 9A shows distortion of image data before correction of focus breathing, and FIG. 9B shows distortion of image data after correction of focus breathing.

As shown in FIG. 9A, points where the distortion amount becomes a maximum are typically points where the image height (the distance from the center of the image) is one. The points are diagonal ends of four corners of the image.

As shown in FIG. 9B, as a result of correction of focus breathing, the correction amount of focus breathing, that is, the magnification/reduction rate of the image is set such that distortion is reduced by the predetermined amount at the image height at which distortion becomes maximum.

With this, distortion can be significantly reduced, and the processing load at the time of distortion correction can be significantly reduced.

Figure 10A:
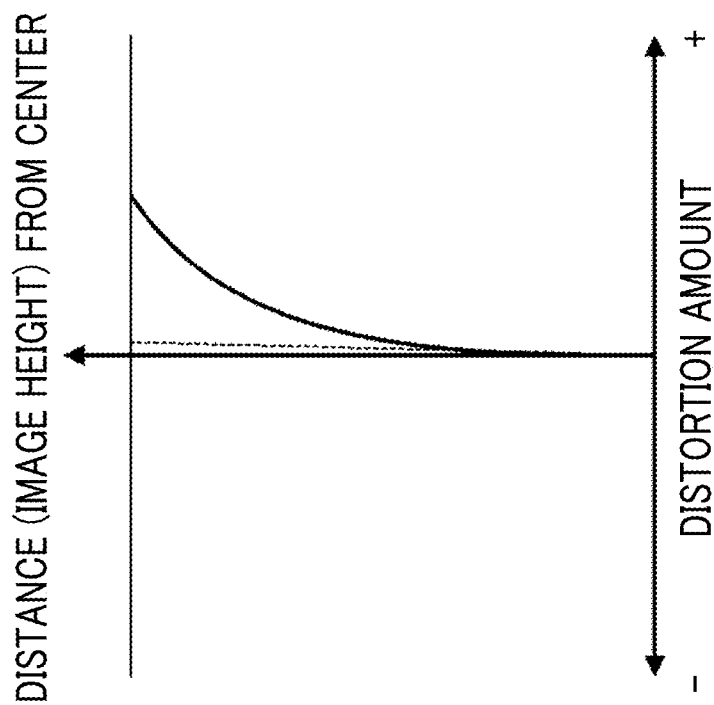
FIGS. 10A and 10B are explanatory views of a case where the correction amount of focus breathing is set to a value for reducing distortion in an image central portion by a predetermined amount.
Figure 10B:
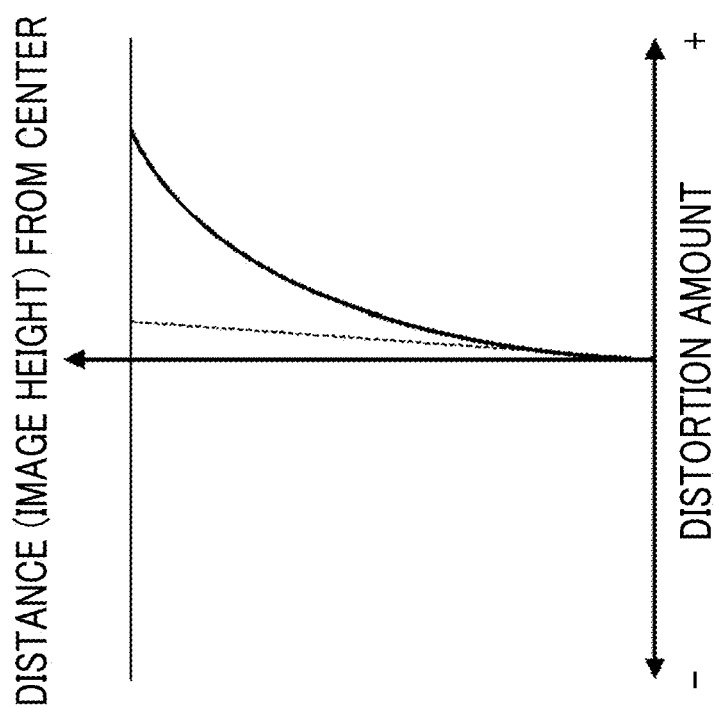

(B) In a case where the correction amount of focus breathing is set to the value for reducing distortion in the image central portion by the predetermined amount FIGS. 10A and 10B are explanatory views in a case where the correction amount of focus breathing is set to the value for reducing distortion in the image central portion by the predetermined amount. FIG. 10A shows distortion of image data before correction of focus breathing, and FIG. 10B shows distortion of image data after correction of focus breathing.

An important subject generally is disposed in the image central portion. Accordingly, image quality of the image central portion can be improved by setting the correction amount of focus breathing such that distortion in the image central portion is reduced by the predetermined amount.

In the present method, the correction amount of focus breathing is set based on an inclination of rising of the distortion curve.

Figure 11A:
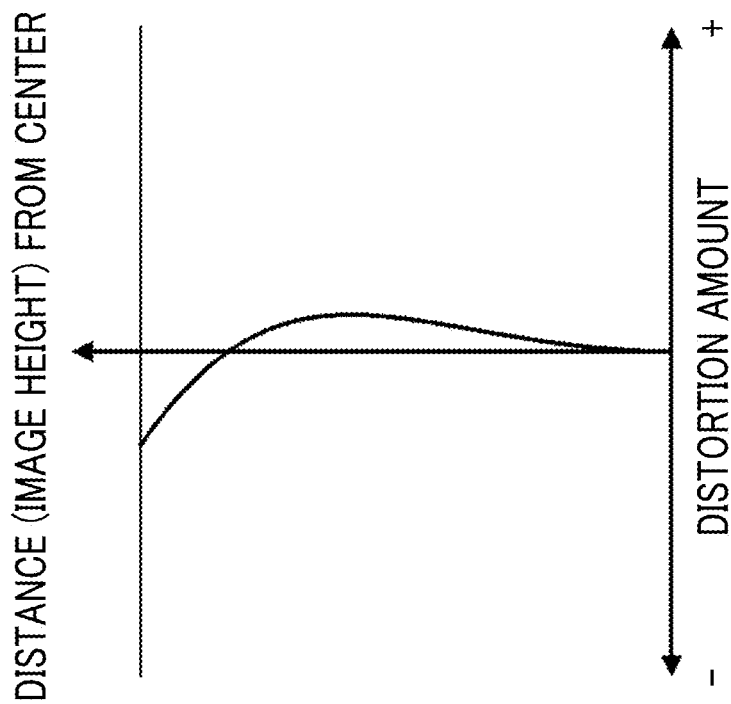
FIGS. 11A and 11B are explanatory views of a case where the correction amount of focus breathing is set to a value for minimizing distortion caused in image data due to an imaging lens.
Figure 11B:
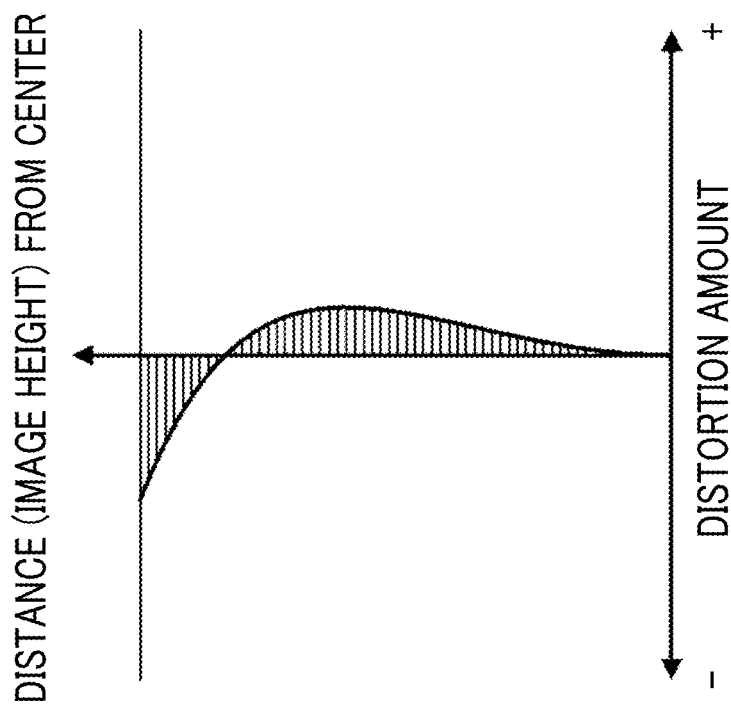

(C) In a case where the correction amount of focus breathing is set to the value for minimizing distortion caused in image data due to the imaging lens FIGS. 11A and 11B are explanatory views in a case where the correction amount of focus breathing is set to the value for minimizing distortion caused in image data due to the imaging lens. FIG. 11A shows distortion of image data before correction of focus breathing, and FIG. 11B shows distortion of image data after correction of focus breathing.

Minimizing distortion is synonymous with minimizing an amount of movement of a pixel in correcting distortion.

In this case, the correction amount of focus breathing is set such that an integration amount of an absolute value of a distortion correction amount becomes a minimum.

With this, a processing load in performing distortion correction on image data after focus breathing correction can be reduced.

A method to be used is decided in consideration of a balance between correction of focus breathing and correction of distortion. That is, in a case where a reduction effect of distortion is excessively increased, a correction effect of focus breathing may be reduced. For this reason, the correction amount of focus breathing is decided in consideration of the balance of both of correction of focus breathing and correction of distortion.

(D) Other Setting Methods

In a case where distortion is corrected by dividing image data into a plurality of region, and in a case where distortion occurs beyond each divided region, correction cannot be appropriately performed. That is, in a case where distortion occurs in excess of the width in the X-axis direction of the block as a processing unit, correction is impossible.

Thus, it is preferable that, in a case where the distortion correction unit executes the correction processing by dividing image data into a plurality of regions, a value correctable in the distortion correction unit is set. That is, the correction amount of focus breathing is set such that distortion appearing in the image data after correction of focus breathing falls within a range of the width in the X-axis direction of the block as a processing unit in the distortion correction unit. With this, image data can be appropriately subjected to the correction processing in the distortion correction unit.

In a case where the correction amount of focus breathing is set from a viewpoint of distortion correction, it is desirable that a direction of magnification and reduction is kept constant. To this end, the imaging lens is configured such that distortion due to the imaging lens appears only either of positive or negative. That is, the appearance of distortion is adjusted according to optical design.

Third Embodiment

As described above, distortion appearing in image data changes by correcting focus breathing through the image processing.

Accordingly, in order to appropriately correct distortion, it is desirable to correct distortion with correction of focus breathing on image data.

The correction of focus breathing is performed for each focus position. Accordingly, in order to appropriately correct distortion, it is preferable to set the correction parameters of distortion for each focus position and to correct distortion.

However, in a case where the correction parameters of distortion are set for each focus position, the amount of data of the correction parameters to be stored increased, and a processing load of correction increases. In a case of the zoom lens, since the correction parameters needs to be set for each zoom position, the amount of data further increases.

For this reason, in regard to distortion correction, the correction processing is executed with the same correction parameters without depending on the focus position. In this case, the correction parameters of distortion at each zoom position are set such that distortion appearing in image data after correction of focus breathing is corrected according to a specific magnification/reduction rate.

The distortion correction unit executes the correction processing of distortion with the correction parameters set for each zoom position without depending on the focus position.

In this way, in regard to distortion correction, the amount of data of the correction parameters to be stored can be reduced by executing the correction processing with the same correction parameters without depending on the focus position. Furthermore, the processing load of distortion correction can be reduced.

Other Embodiments

«Configuration of Imaging Lens»

The imaging lens may be composed of a monofocal imaging lens with no optical zoom lens function. Furthermore, the imaging lens may be fixed or may be interchangeable. In a case configuration in which the imaging lens is interchangeable, the correction parameters of focus breathing correction and distortion correction are prepared for each imaging lens.

«Sequence of Processing in Image Signal Processing Unit»

In the above-described embodiment, although a configuration in which distortion is corrected after focus breathing is corrected has been made, since the correction amount is known, a configuration in which focus breathing is corrected after distortion is corrected may be made.

«Focus Breathing Correction and Distortion Correction»

The correction of focus breathing and distortion may be performed using known methods other than the above-described method.

«Focusing»

As a system of focusing, a system that changes the focus position in a stepwise manner may be employed.

Figure 12:
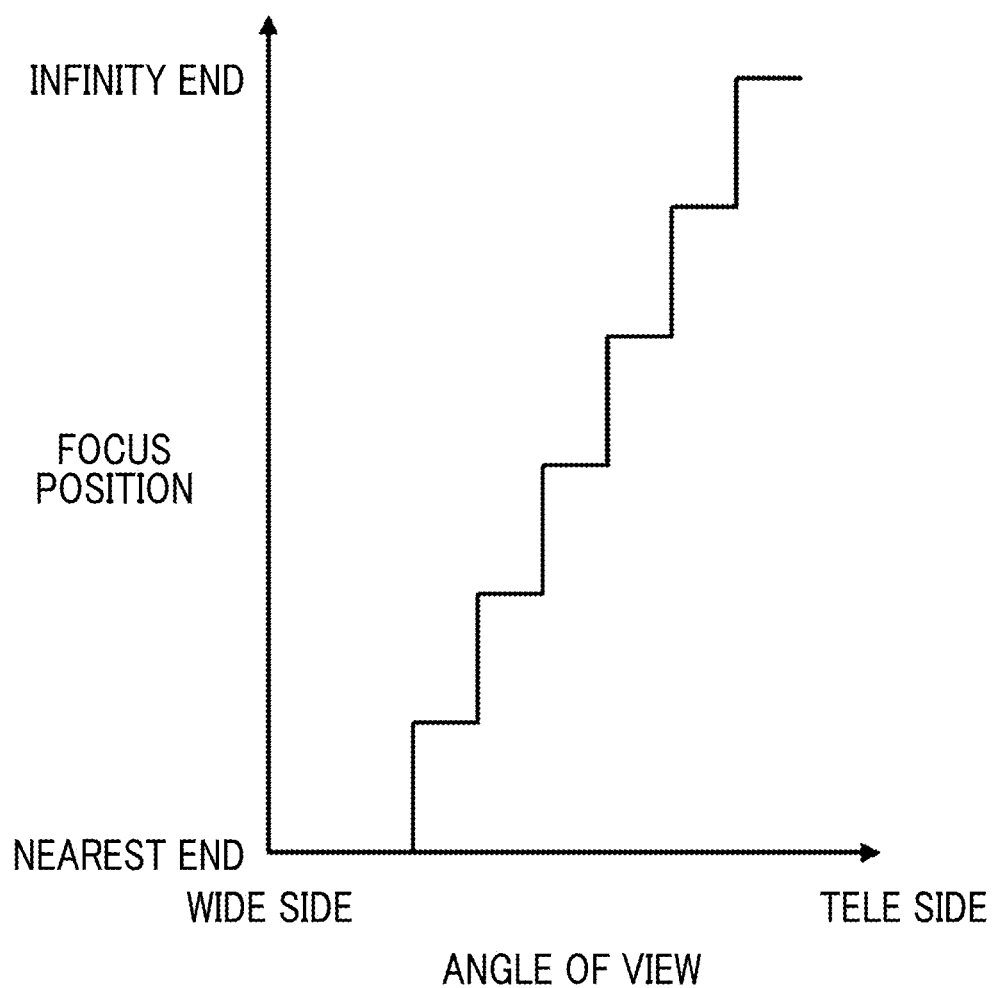
FIG. 12 is a graph showing the relationship between the focus position and the angle of view in a case where the focus position is changed in a stepwise manner.

FIG. 12 is a graph showing the relationship between the focus position and the angle of view in a case where the focus position is changed in a stepwise manner.

In a case where the focus position is changed in a stepwise manner, the angle of view also changes in a stepwise manner. The focus breathing correction unit 64 subjects image data to the magnification/reduction processing according to the magnification/reduction rate determined for each focus position to correct focus breathing.

«Configuration as Image Processing Apparatus»

In the above-described embodiment, although an example as an imaging apparatus has been described, an image processing apparatus that acquires and processes image data obtained by imaging may be configured. In this case, the image processing apparatus has the focus breathing correction unit 64, the distortion correction unit 66, and the control unit 80 in the imaging apparatus 1 of the above-described embodiment. In this case, a computer may be caused to execute a predetermined image processing program to provide functions as the image processing apparatus. That is, the computer may be made to implement the functions as the focus breathing correction unit 64, the distortion correction unit 66, and the control unit 80 to provide the functions as the image processing apparatus.

«Configuration of Processing Unit»

In the above-described embodiment, hardware structures of processing units that execute various kinds of processing, such as the image signal processing unit 60 (image data generation unit 62, focus breathing correction unit 64, and distortion correction unit 66) and the control unit 80 are various processors as follows. Various processors include a central processing unit (CPU) that is a general-purpose processor executing software (program) to function as various processing units, programmable logic devices (PLD) that are processors capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured of one of various processors described above or may be configured of a combination (for example, a combination of a plurality of FPGAs or a combination of a CPU and an FPGA) of two or more processors of the same type or different types.

A plurality of processing units may be configured of one processor. As an example where a plurality of processing units are configured of one processor, first, as represented by a computer, such as a client or a server, there is a form in which one processor is configured of a combination of one or more CPUs and software, and the processor functions as a plurality of processing units. Secondly, as represented by system on chip (SoC) or the like, there is a form in which a processor that implements all functions of a system including a plurality of processing units into one integrated circuit (IC) chip is used. In this way, various processing units may be configured using one or more processors among various processors described above as a hardware structure.

In addition, the hardware structure of various processors is, more specifically, an electric circuit (circuitry) in which circuit elements, such as semiconductor elements, are combined.

In a case where the processing units are configured of a CPU, the CPU functions as the image signal processing unit 60 (image data generation unit 62, focus breathing correction unit 64, and distortion correction unit 66) and the control unit 80 by executing a predetermined image processing program. At this time, a memory (for example, a random access memory (RAM)) as a work area and a memory (for example, a read only memory (ROM)) as a storage unit that stores data (correction parameters and the like) needed for various kinds of processing are provided.

EXAMPLES

An experiment to confirm that distortion appearing in image data fluctuates by correcting focus breathing through the image processing has been conducted.

Example 1

Figure 13:
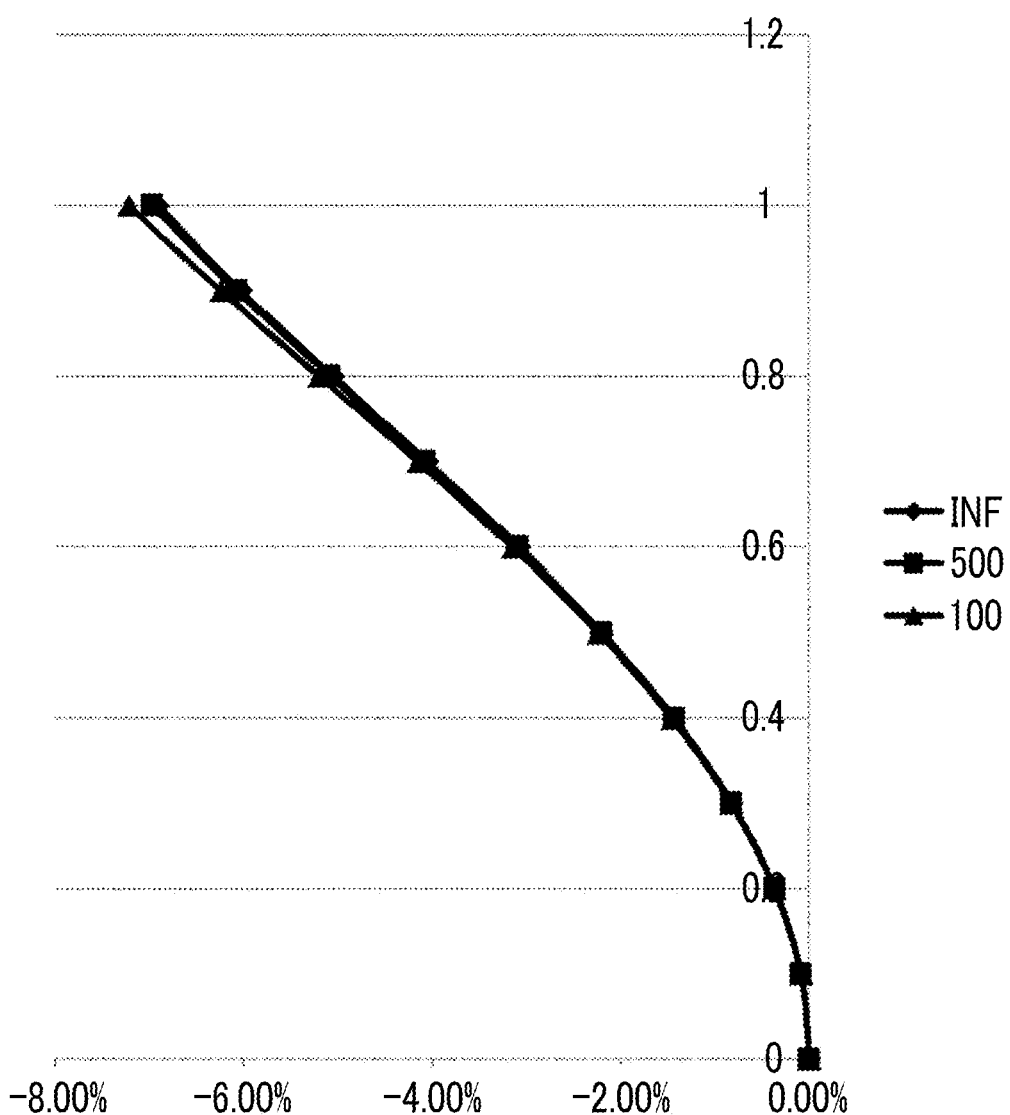
FIG. 13 is a graph showing a measurement result of distortion of image data captured using a certain imaging lens.

FIG. 13 is a graph (distortion curve) showing a measurement result of distortion of image data captured using a certain imaging lens (imaging lens A).

FIG. 13 shows distortion in a case where an object distance indicating a focus position is infinity (INF), 500 mm, and 100 mm. Distortion occurs due to imaging lens A.

Figure 14:
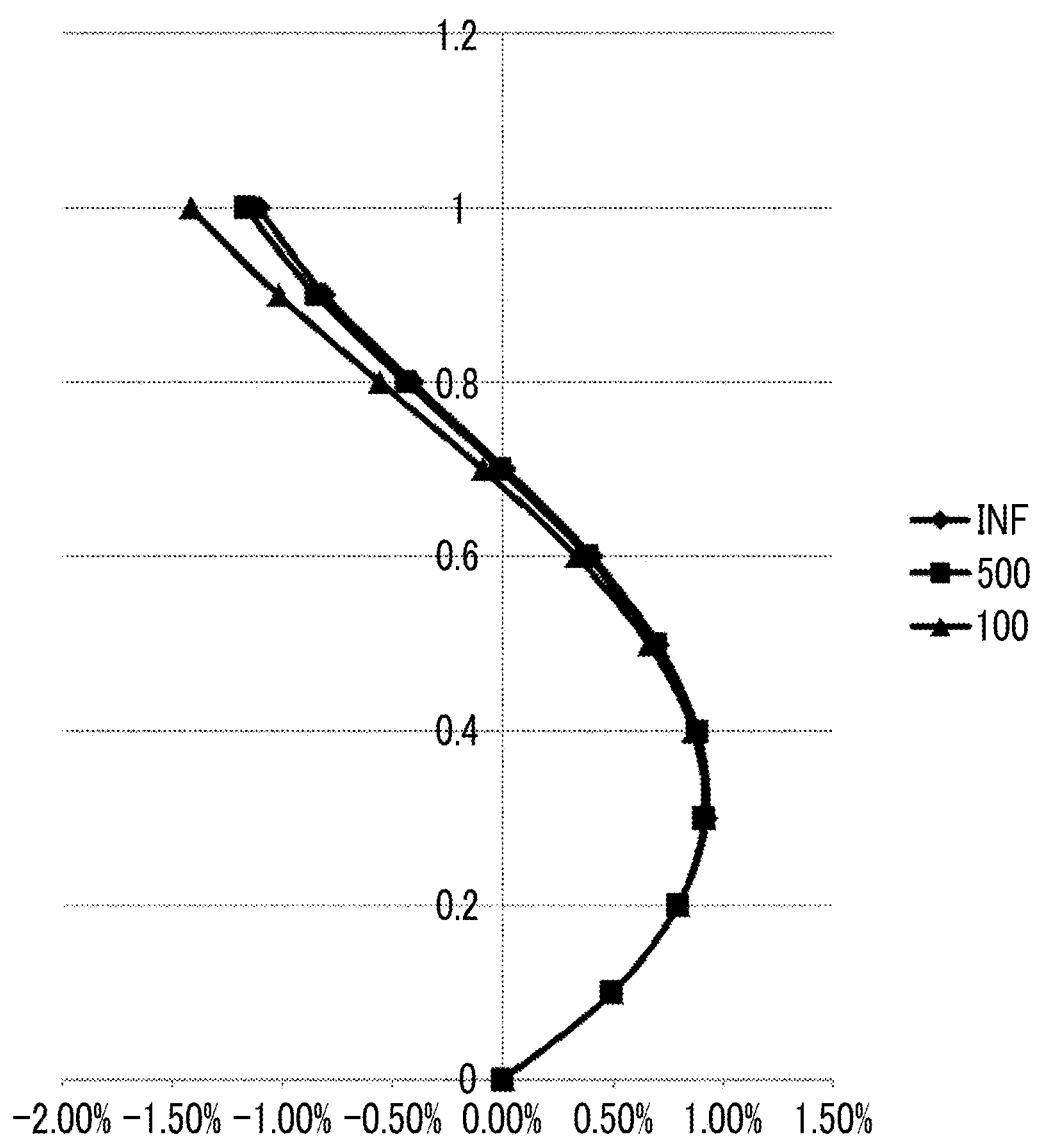
FIG. 14 is a distortion curve of image data after correction of focus breathing through image processing.

FIG. 14 is a distortion curve image data after correction of focus breathing through the image processing.

Focus breathing has been corrected under the following conditions. That is, focus breathing has been corrected by setting the magnification/reduction rate to 5.8% at all object distances.

As will be understood by comparison of FIGS. 13 and 14, distortion appearing in image data fluctuates by correcting focus breathing through the image processing. Furthermore, as will be understood by comparison of FIGS. 13 and 14, distortion fluctuates in a decreasing direction.

Example 2

Figure 15:
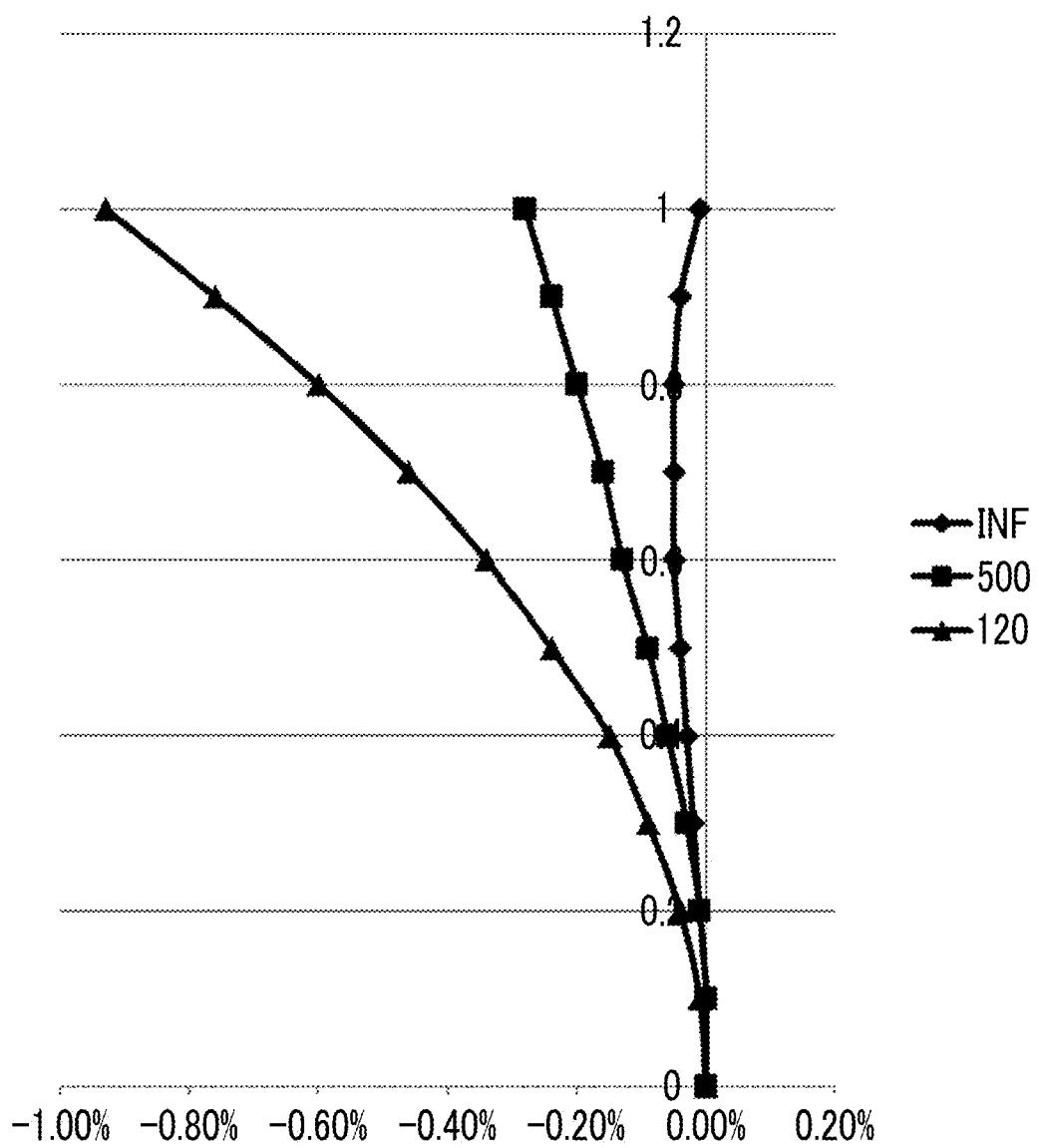
FIG. 15 is a graph showing a measurement result of distortion of image data captured using a certain imaging lens.

FIG. 15 is a graph (distortion curve) showing a measurement result of distortion of image data captured using a certain imaging lens (imaging lens B).

FIG. 15 shows distortion in a case where the object distance indicating the focus position is infinity (INF), 500 mm, and 120 mm. Distortion occurs due to the imaging lens B.

Figure 16:
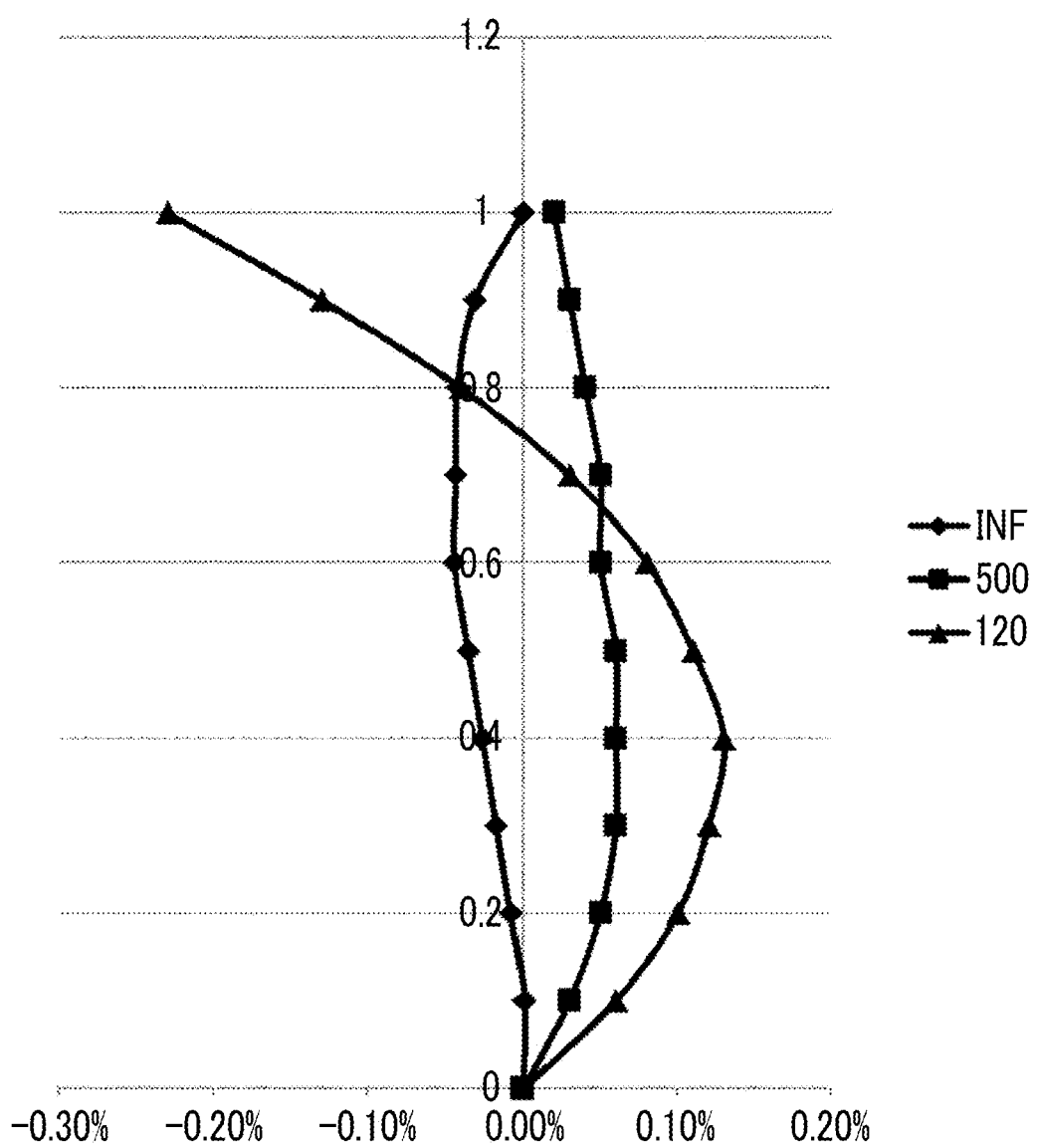
FIG. 16 is a distortion curve of image data after correction of focus breathing through image processing.

FIG. 16 is a distortion curve of image data after correction of focus breathing through the image processing.

Focus breathing has been corrected under the following conditions. Focus breathing has been corrected by setting the magnification/reduction rate to 0.01% in a case where the object distance is infinity, setting the magnification/reduction rate to 0.3% in a case where the object distance is 500 mm, and setting the magnification/reduction rate to 0.7% in a case where the object distance is 120 mm.

As will be understood by comparison of FIGS. 15 and 16, distortion appearing in image data fluctuates by performing focus breathing correction through the image processing. As will be understood by comparison of FIGS. 15 and 16, distortion fluctuates in a decreasing direction.

In this way, in a case where focus breathing is corrected through the image processing on image data including distortion, it is possible to confirm that distortion fluctuates in a decreasing direction.

In regard to distortion correction, the correction parameters are set such that distortion appearing in image data after correction of focus breathing is corrected, and the correction processing is executed.

EXPLANATION OF REFERENCES

1: imaging apparatus
10: imaging lens
12: focusing lens
14: zoom lens
14A: variator lens
14B: compensator lens
16: stop
18: relay lens
20: lens drive unit
22: focusing lens drive unit
24: zoom lens drive unit
26: stop drive unit
30: detection unit
32: focusing lens position detection unit
34: zoom lens position detection unit
36: aperture amount detection unit
40: image sensor
50: analog front end (AFE)
60: image signal processing unit
62: image data generation unit
64: focus breathing correction unit
66: distortion correction unit
70: operating unit
80: control unit
F: frame indicating range of image segmentation
O: image center (optical axis)
Q1: quadrant
Q2: quadrant
Q3: quadrant
Q4: quadrant

What is claimed is:

1. An imaging apparatus comprising:
an imaging lens having a focusing lens;
an image sensor that captures an image formed by the imaging lens;
an image data generation unit that processes a signal output from the image sensor to generate image data;
a focus breathing correction unit that corrects focus breathing by subjecting the image data to magnification/reduction processing according to a magnification/reduction rate determined for each focus position; and
a distortion correction unit that corrects distortion appearing in the image data after correction of focus breathing through image processing,
wherein the magnification/reduction rate is set to a value for reducing distortion caused in the image data due to the imaging lens by a predetermined amount at an image height at which distortion becomes a maximum.

2. The imaging apparatus according to claim 1,
wherein the magnification/reduction rate is set to a value for minimizing distortion caused in the image data due to the imaging lens.

3. The imaging apparatus according to claim 2,
wherein distortion caused in the image data due to the imaging lens is only either of positive or negative.

4. The image apparatus according to claim 2,
wherein the distortion correction unit corrects distortion appearing in the image data after correction of focus breathing according to a specific magnification/reduction rate through image processing.

5. The imaging apparatus according to claim 1,
wherein the magnification/reduction rate is set to a value for reducing distortion in an image central portion by a predetermined amount.

6. The imaging apparatus according to claim 5,
wherein distortion caused in the image data due to the imaging lens is only either of positive or negative.

7. The image apparatus according to claim 5,
wherein the distortion correction unit corrects distortion appearing in the image data after correction of focus breathing according to a specific magnification/reduction rate through image processing.

8. The imaging apparatus according to claim 1,
wherein, in a case where the distortion correction unit divides the image data into a plurality of regions and executes correction processing for each region, the magnification/reduction rate is set to a value correctable in the distortion correction unit.

9. The imaging apparatus according to claim 8,
wherein distortion caused in the image data due to the imaging lens is only either of positive or negative.

10. The imaging apparatus according to claim 1,
wherein distortion caused in the image data due to the imaging lens is only either of positive or negative.

11. The image apparatus according to claim 1,
wherein the distortion correction unit corrects distortion appearing in the image data after correction of focus breathing according to a specific magnification/reduction rate through image processing.

12. An image processing apparatus comprising:
an image data acquisition unit that acquires image data obtained through imaging;
a focus position information acquisition unit that acquires information of a focus position of an imaging lens when the image data is captured;
a focus breathing correction unit that corrects focus breathing by subjecting the image data to magnification/reduction processing according to a magnification/reduction rate determined for each focus position; and
a distortion correction unit that corrects distortion appearing in the image data after correction of focus breathing through image processing,
wherein the magnification/reduction rate is set to a value for reducing distortion caused in the image data due to the imaging lens by a predetermined amount at an image height at which distortion becomes a maximum.

13. An image processing method comprising:
a step of acquiring image data obtained through imaging;
a step of acquiring information of a focus position of an imaging lens when the image data is captured;
a step of correcting focus breathing by subjecting the image data to magnification/reduction processing according to a magnification/reduction rate determined for each focus position; and
a step of correcting distortion appearing in the image data after correction of focus breathing through image processing,
wherein the magnification/reduction rate is set to a value for reducing distortion caused in the image data due to the imaging lens by a predetermined amount at an image height at which distortion becomes a maximum.

14. A non-transitory computer readable recording medium storing an image processing program that causes a computer to implement:
a function of acquiring image data obtained through imaging;
a function of acquiring information of a focus position of an imaging lens when the image data is captured;
a function of correcting focus breathing by subjecting the image data to magnification/reduction processing according to a magnification/reduction rate determined for each focus position; and
a function of correcting distortion appearing in the image data after correction of focus breathing through image processing,
wherein the magnification/reduction rate is set to a value for reducing distortion caused in the image data due to the imaging lens by a predetermined amount at an image height at which distortion becomes a maximum.

* * * * *